(12) United States Patent
Nakajima

(10) Patent No.: US 11,766,898 B2
(45) Date of Patent: Sep. 26, 2023

(54) TIRE

(71) Applicant: SUMITOMO RUBBER INDUSTRIES, LTD., Hyogo (JP)

(72) Inventor: Koichi Nakajima, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 23 days.

(21) Appl. No.: 17/485,969

(22) Filed: Sep. 27, 2021

(65) Prior Publication Data

US 2022/0097460 A1   Mar. 31, 2022

(30) Foreign Application Priority Data

Sep. 28, 2020   (JP) ................................ 2020-162422

(51) Int. Cl.
*B60C 11/13*   (2006.01)
*B60C 11/03*   (2006.01)

(52) U.S. Cl.
CPC ... *B60C 11/1315* (2013.01); *B60C 2011/0365* (2013.01)

(58) Field of Classification Search
CPC ......... B60C 11/1315; B60C 2011/0365; B60C 11/1392; B60C 11/1376; B60C 11/0323; B60C 11/1307; B60C 2011/1338; B60C 11/1281
See application file for complete search history.

(56) References Cited

U.S. PATENT DOCUMENTS

| | | | |
|---|---|---|---|
| 5,503,207 A * | 4/1996 | Ochiai | B60C 11/0309 152/209.21 |
| 2007/0102085 A1* | 5/2007 | Ohashi | B60C 11/0316 152/209.18 |
| 2016/0318347 A1 | 11/2016 | Bardin et al. | |
| 2017/0120692 A1 | 5/2017 | Durand-Gasselin et al. | |
| 2018/0312006 A1* | 11/2018 | Bonnet | B60C 9/0064 |
| 2019/0322141 A1* | 10/2019 | Nakajima | B60C 11/1315 |
| 2021/0129594 A1* | 5/2021 | Furusawa | B60C 11/01 |

FOREIGN PATENT DOCUMENTS

| | | |
|---|---|---|
| DE | 102010017010 A1 * 11/2011 | ............. B60C 11/11 |
| JP | 2017-509531 A   4/2017 | |

OTHER PUBLICATIONS

Rittweger, English Machine Translation of DE 102010017010, 2011 (Year: 2011).*
Extended European Search Report in Corresponding EP Application No. 21195990.3, dated Mar. 14, 2022.

* cited by examiner

*Primary Examiner* — Justin R Fischer
*Assistant Examiner* — Brendon Charles Darby
(74) *Attorney, Agent, or Firm* — Greenblum & Bernstein, P.L.C.

(57) ABSTRACT

A lateral groove provided in a tread portion has: an opening formed in a tread surface; a minimum portion having the smallest groove width, positioned radially inside the opening; and a maximum portion having the largest groove width, positioned radially inside the minimum portion. The width of the opening increases toward the outside in the tire axial direction.

20 Claims, 11 Drawing Sheets

Tire equator side ←→ Tread edge side

TIRE

TECHNICAL FIELD

The present disclosure relates to a tire.

BACKGROUND ART

The following Patent Document 1 discloses a tire having a tread portion provided with a circumferential groove defining an edge portion, and a cut disposed at the edge portion. The cut comprises a first portion having an average width, and a void portion forming, inside the first portion, a channel larger than the average width. The tire having such tread portion is described as being capable of maintaining its performance when the tire is worn.
Patent Document 1: Japanese Patent Application Publication No. 2017-509531

SUMMARY OF THE DISCLOSURE

Problems to be Solved by the Disclosure

In recent years, there is a tire in which, during braking under dry conditions, the ground contact pressure acts higher in an axially outer part than an axially inner part of the tread surface. In such a tire, during braking under dry conditions, the difference in frictional force between the axially inner part and axially outer part of the tread surface becomes large, and the braking performance tends to deteriorate. For this reason, there is a demand for tires improved in the braking performance while suppressing uneven wear.

The present disclosure has been devised in view of the above circumstances, and a primary object of the present disclosure is to provide a tire in which the braking performance can be improved while maintaining uneven wear resistance.

Means for Solving the Problems

According to the present disclosure, a tire comprises a tread portion which has a tread surface and is provided with a lateral groove extending in a tire axial direction, wherein in the tread surface, the lateral groove has an opening of which width increases toward an outside in the tire axial direction, and in a cross section of the lateral groove perpendicular to the longitudinal direction of the lateral groove, the lateral groove has a minimum portion at which the groove width is smallest and which is located radially inside the opening, and a maximum portion at which the groove width is largest and which is located radially inside the minimum portion.

Effects of the Disclosure

By adopting the above configuration, the tire of the present disclosure can be improved in the braking performance while maintaining the uneven wear resistance.

DESCRIPTION OF THE PREFERRED EMBODIMENTS

Hereinafter, an embodiment of the present disclosure will be described with reference to the drawings.

Figure 1:
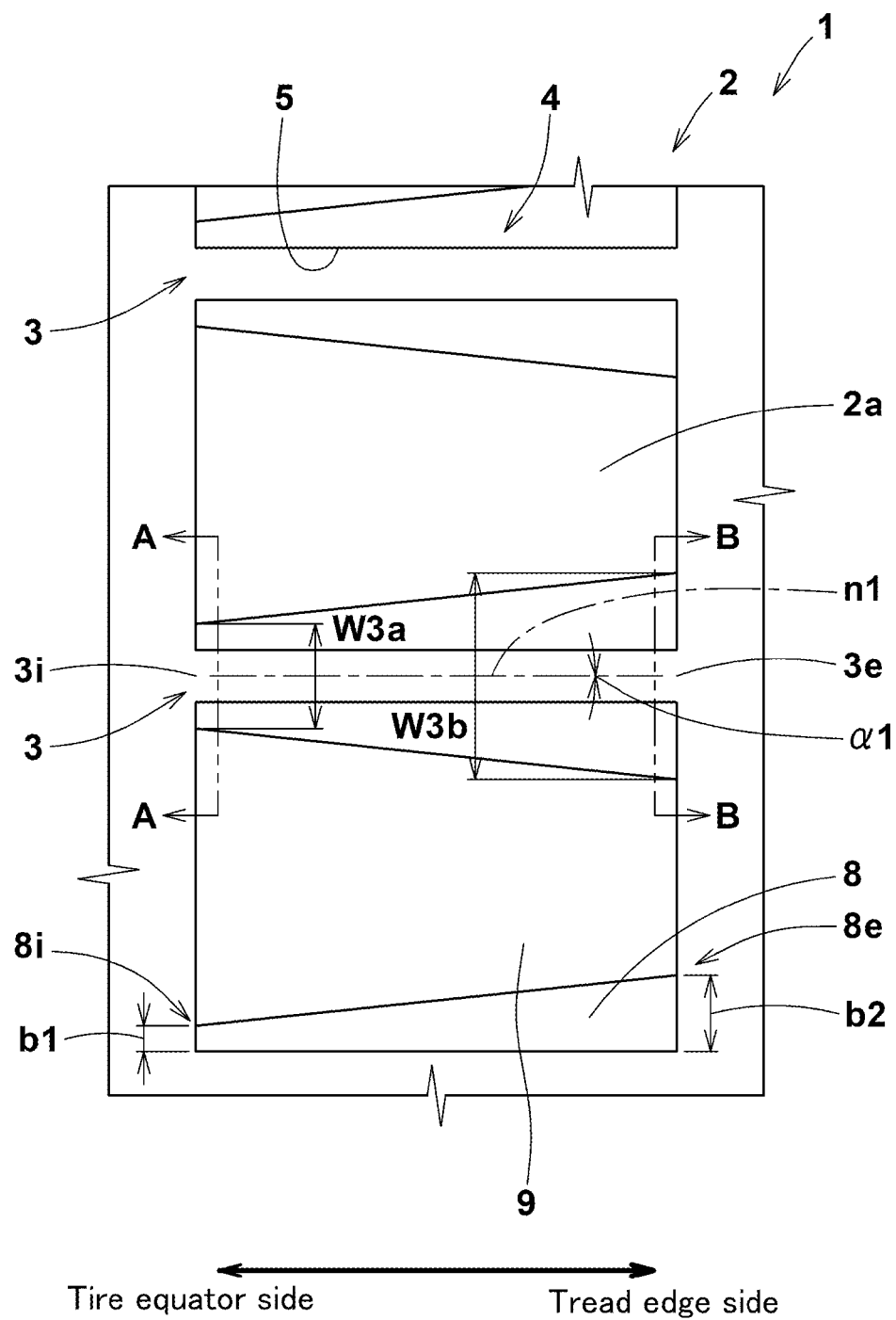
FIG. 1 is a plan view of a part of a tread portion of a tire as an embodiment of the present disclosure, showing a lateral groove.

FIG. 1 is a plan view of a part of a tread portion 2 of a tire 1 as an embodiment of the present disclosure.

The tire 1 in the present embodiment is suitably applied to a pneumatic tire for a passenger car, for example.

Meanwhile, the present disclosure may be applied to a pneumatic tire for heavy load as well as a non-pneumatic tire of which inside is not filled with pressurized air.

The tread portion 2 in the present embodiment is provided with lateral grooves 3 extending in a tire axial direction as shown in FIG. 1.

In the present specification, the expression "extending in a tire axial direction" means that the angle $\alpha 1$ of a groove bottom center line n1 passing through the axially inner end $3i$ and axially outer end $3e$ of the lateral groove 3 extends while inclining at 45 degrees or less with respect to the axial direction of the tire.

The lateral grooves 3 are preferably inclined so that the angle $\alpha 1$ is 30 degrees or less, more preferably 15 degrees or less.

Figure 2A:
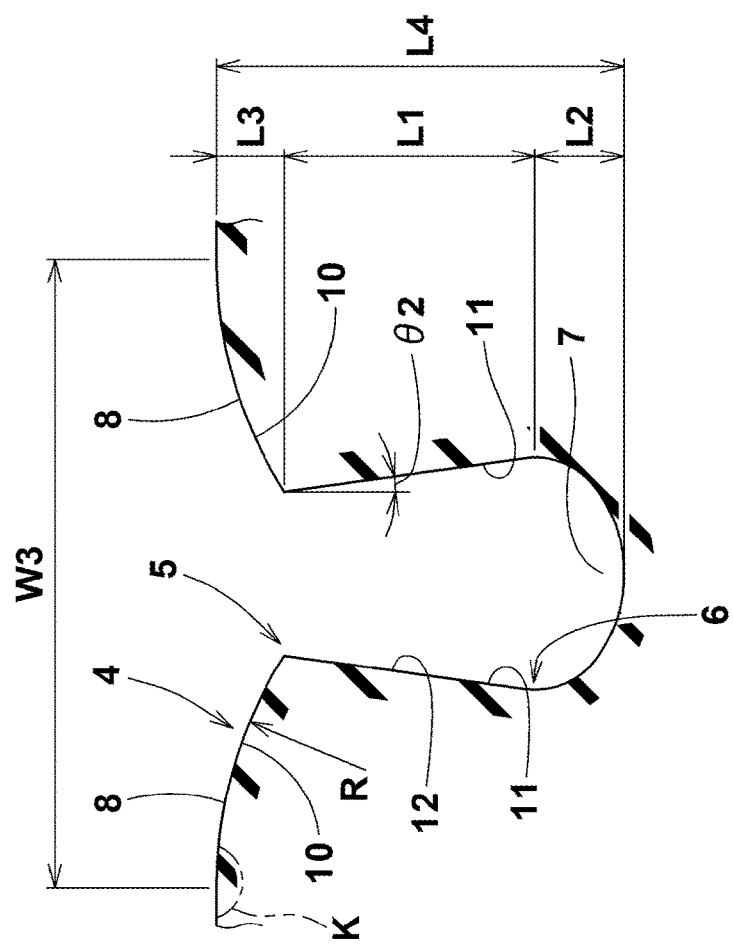
FIG. 2A is a cross-sectional view of the lateral groove taken along line A-A of FIG. 1.
Figure 2B:
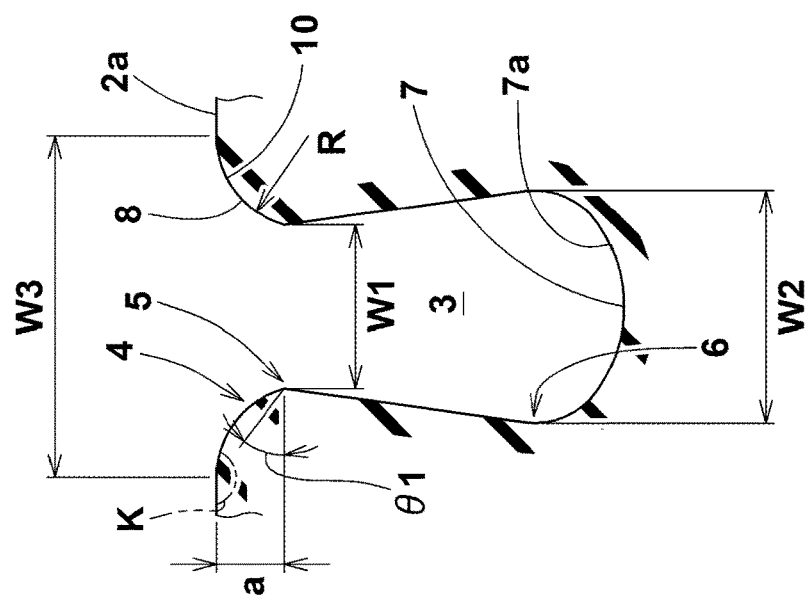
FIG. 2B is a cross-sectional view of the lateral groove taken along line B-B of FIG. 1.

FIG. 2A is a cross-sectional view of the lateral groove 3 taken along line A-A of FIG. 1. FIG. 2B is a cross-sectional view of the lateral groove 3 taken along line B-B of FIG. 1.

Figure 3:
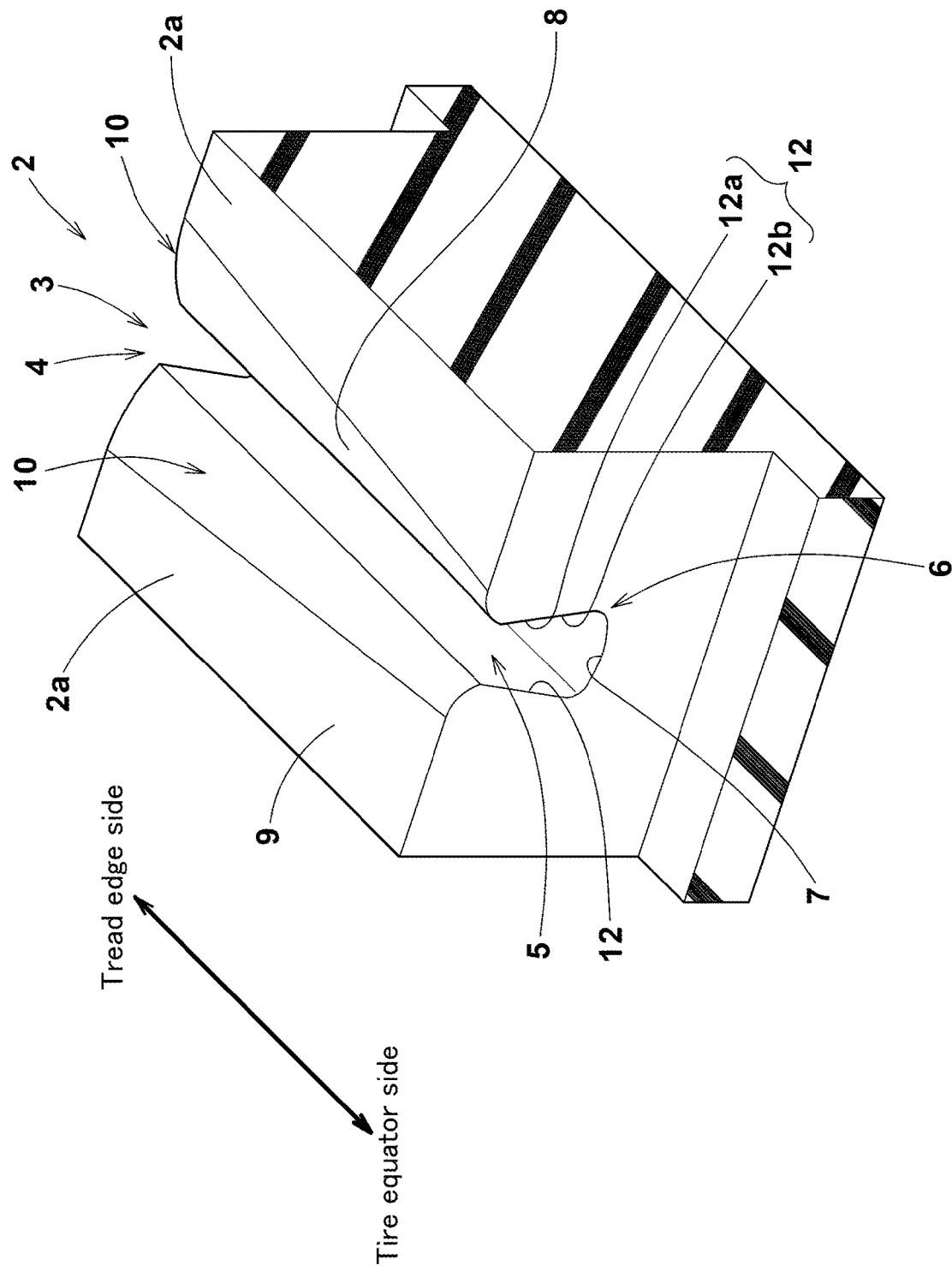
FIG. 3 is a perspective view of the lateral groove shown in FIG. 1.

FIG. 3 is a perspective view of the lateral groove 3 in the tread portion 2 shown in FIG. 1.

As shown in FIG. 1 to FIG. 3, the lateral groove 3 in the present embodiment has, in its cross section, an opening 4 formed in the tread surface $2a$, a minimum portion 5 located radially inside the opening 4, and a maximum portion 6 located radially inside the minimum portion 5.

The minimum portion 5 is a portion having the smallest groove width W1. In the minimum portion 5, for example, the groove width W1 is locally reduced.

The maximum portion 6 is a portion having the largest groove width W2. In the maximum portion 6, for example, the groove width W2 is locally increased.

The above-mentioned "cross section" is a cross section perpendicular to the longitudinal direction of the lateral groove 3.

Unless otherwise noted in the present specification, dimensions and the like of portions of the tire 1 mean values measured in a normal state.

Here, in the case of a pneumatic tire, the "normal state" is a no-load state in which the tire 1 is mounted on a normal rim and inflated to a normal internal pressure.

The "normal rim" is a rim specified for the tire in a standard system including a standard on which the tire 1 is based, for example, the "standard rim" in JATMA, "Design Rim" in TRA, and "Measuring Rim" in ETRTO.

The "normal internal pressure" is an air pressure specified for the tire in a standard system including a standard on which the tire 1 is based, for example, the "maximum air pressure" in JATMA, a maximum value described in the table "TIRE LOAD LIMITS AT VARIOUS COLD INFLATION PRESSURES" in TRA, and "INFLATION PRESSURE" in ETRTO.

In such lateral groove 3, the load at the time of braking is relaxed between the opening 4 and the minimum portion 5, and the uneven wear resistance of the tire 1 can be improved. Further, when the uneven wear resistance is improved, the noise performance is also improved. Further, by the load during braking, the region between the opening 4 and the minimum portion 5 becomes closer to the road surface and contacts therewith, so the ground contact area of the tire 1 increases, and the braking performance can be improved. Further, when the opening 4 portion is worn and the minimum portion 5 approaches the tread surface 2a, the groove volume is reduced, which enhances the noise reduction effect.

In the tread plan view, the width w3 of the opening 4 increases toward the outside in the tire axial direction.

As a result, in an axially outside part of the opening 4 around which a relatively large contact pressure acts during braking under dry conditions, the region between the opening 4 and the minimum portion 5 can be flexibly deformed to contact with the ground. Therefore, the ground contact area becomes larger on the axially outer side of the lateral groove 3, therefore, the ground contact pressure is equalized between the axially inner side and the axially outer side. As a result, the friction coefficient (mu) becomes large, and the braking performance is improved.

Further, such lateral groove 3 suppresses a pumping noise from becoming locally increased on the axially inside and the axially outside, and improves the noise performance. Therefore, the tire 1 in the present embodiment is improved in the braking performance while maintaining the uneven wear resistance.

Further, such lateral groove 3 improves the noise performance. In the present embodiment, the width w3 of the opening 4 is continuously increased toward the outside in the tire axial direction.

The width w3a of the opening 4 at the axially inner end 3i of the lateral groove 3 is preferably 40% or more, more preferably 50% or more, but preferably 70% or less, more preferably 65% or less of the width w3b of the opening 4 at the axially outer end 3e of the lateral groove 3.

In the present specification, the width w3 of the opening 4 is the length measured in the groove width direction of the lateral groove 3 between the groove edges when the boundaries between the lateral groove 3 and the tread surface 2a can be clearly distinguished by the groove edges. If the boundaries are unclear, the width w3 of the opening 4 is the length measured in the groove width direction of the lateral groove 3 between both grounding edges of the lateral groove 3 when the tire 1 under the normal state is placed on a flat surface at a camber angle of 0 degree, and loaded with 70% of a normal load.

The "normal load" is the load specified for the tire in a standard system including a standard on which the tire is based, for example, the "maximum load capacity" in JATMA, the maximum value described in the table "TIRE LOAD LIMITS AT VARIOUS COLD INFLATION PRESSURES" in TRA, and "LOAD CAPACITY" in ETRTO.

The tire 1 in the present embodiment can be further defined by a footprint shape factor (FSF) determined when the tire 1 under the normal state is placed on a flat surface at a camber angle of 0 degree and loaded by 100% of the normal load. The FSF is a ratio (La/Lb) of lengths La and Lb in the tire circumferential direction of the ground contact surface 2s of the tire 1.

Figure 11:
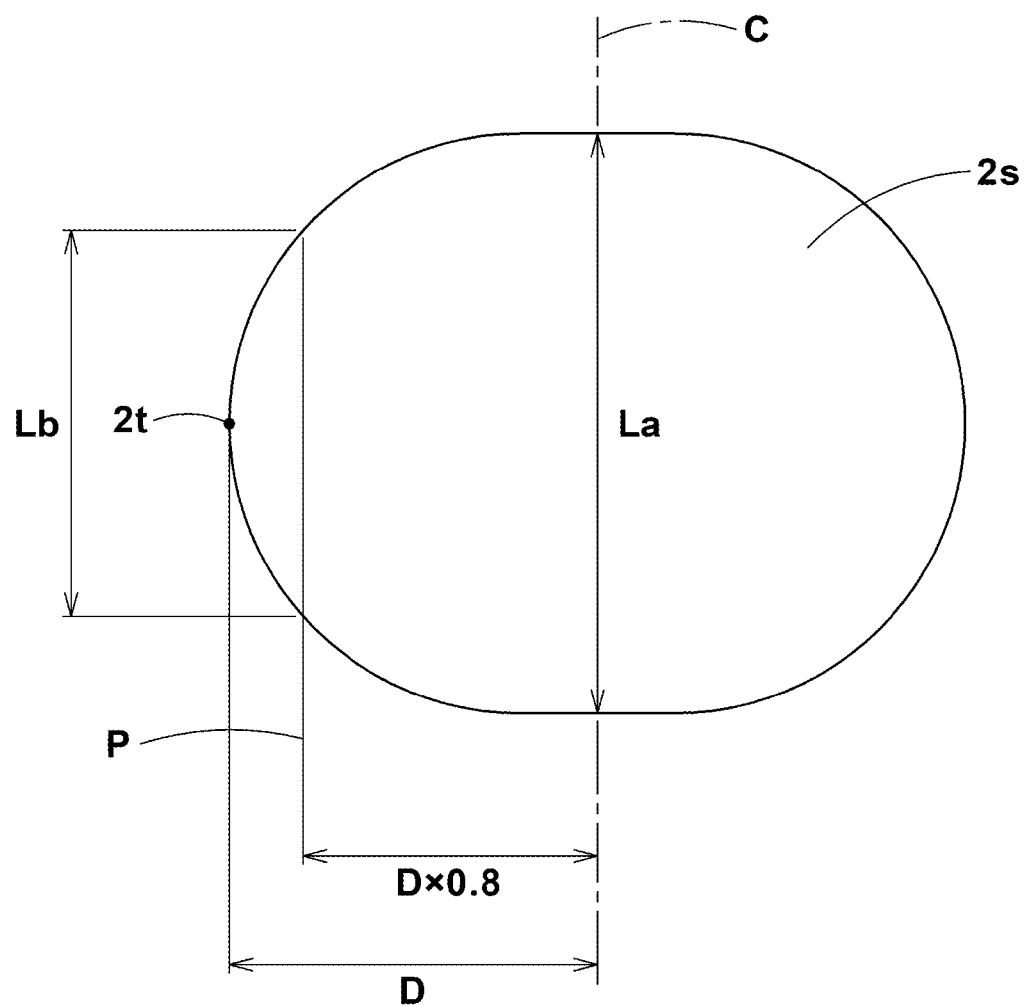
FIG. 11 is a diagram for explaining a tire footprint and a footprint shape factor.

In the present embodiment, as shown in FIG. 11, the length La is measured at the tire equator C, and the length Lb is measured at a position P.

The position P is separated axially outwardly from the tire equator C by 80% of the length D in the tire axial direction between the tire equator C and a ground contact edge 2t. Preferably, the FSF ratio (La/Lb) is adjusted in a range from 1.10 to 1.15.

In the tire 1, for example, a mounting direction when the tire is mounted on a vehicle is specified for the tread portion 2. The tire 1 is not limited to the one in which the mounting direction is specified.

The lateral groove 3 comprises, for example, a groove bottom portion 7 located on the innermost side in the tire radial direction.

It is preferable that the minimum distance L1 in the tire radial direction between the minimum portion 5 and the maximum portion 6 is larger than the minimum distance L2 in the tire radial direction between the maximum portion 6 and the groove bottom portion 7.

In such tire 1, since the maximum portion 6 is located radially inside the intermediate position between the minimum portion 5 and the groove bottom portion 7, the decrease in rigidity due to the maximum portion 6 is suppressed, and the braking performance of the tire 1 is improved.

In the present embodiment, the minimum distance L3 in the tire radial direction between the opening 4 and the minimum portion 5 is smaller than the minimum distance L1 in the tire radial direction between the minimum portion 5 and the maximum portion 6.

It is preferable that the minimum distance L3 in the tire radial direction between the opening 4 and the minimum portion 5 is larger than the minimum distance L2 in the tire radial direction between the maximum portion 6 and the groove bottom portion 7.

Such lateral groove 3 can maintain the rigidity of the tire 1 within an appropriate range, and can achieve both the uneven wear resistance and the braking performance of the tire 1.

It is preferable that the minimum distance L3 in the tire radial direction between the opening 4 and the minimum portion 5 is 40% or less of the minimum distance L4 in the tire radial direction between the opening 4 and the groove bottom portion 7.

Here, the minimum distance L4 between the opening 4 and the groove bottom portion 7 corresponds to the groove depth of the lateral groove 3.

If the minimum distance L3 in the tire radial direction between the opening 4 and the minimum portion 5 is larger than 40% of the minimum distance L4 in the tire radial direction between the opening 4 and the groove bottom portion 7,
then the load during braking may be concentrated on an end portion K including the radially outer end of the opening 4 of the lateral groove 3 (corner portion between a road surface and the opening 4), and the uneven wear resistance and the braking performance may not be improved.

In order to improve the braking performance, the minimum distance L3 between the opening 4 and the minimum portion 5 is preferably 25% or more of the minimum distance L4 between the opening 4 and the groove bottom portion 7.

In the present embodiment, the width w3 of the opening 4 is larger than the groove width W2 of the maximum portion 6.

Such opening 4 can improve the braking performance of the tire 1 by distributing the load during braking while maintaining the minimum distance L3 between the opening 4 and the minimum portion 5.

In the present embodiment, even at the axially inner end 3i of the lateral groove 3, the width w3 of the opening 4 is larger than the groove width W2 of the maximum portion 6.

In the present embodiment, the lateral groove 3 comprises, between the opening 4 and the minimum portion 5, an inclined surface 8 inclined with respect to the radial direction of the tire.

The lateral groove 3, from the opening 4 to the minimum portion 5, is formed by the inclined surface 8.

The inclined surface 8 facilitates the contact with the road surface due to the load during braking, and enhances the braking performance and uneven wear resistance.

In the cross section of the lateral groove 3, the inclined surface 8 has an arcuate portion 10, which is convex toward the inside of the lateral groove 3. Such inclined surface 8 effectively exerts the above-mentioned function.

In the present embodiment, the entire inclined surface 8 is formed by the arcuate portion 10.

In the present embodiment, the inclined surface 8 is formed as a curved surface in which the arcuate portion 10 extends axially inward and axially outward of the lateral groove 3. The inclined surface 8 is not limited to such configuration, and may be formed as, for example, a flat surface which is linear in the cross section of the lateral groove 3 (not shown).

In the present embodiment, the arcuate portion 10 has a radius R of curvature which increases toward the outside in the tire axial direction. For example, the arcuate portion 10 has the radius R of curvature which increases continuously toward the outside in the tire axial direction.

As a result, in the tire in which the contact pressure is higher on the outside in the tire axial direction than on the inside in the tire axial direction as in the present embodiment, the change in the contact pressure in the tire axial direction becomes smooth (uniform), and the frictional force coefficient during braking under dry conditions is increased, and the braking performance is improved. Further, such tire 1 has excellent uneven wear resistance.

At the axially inner end 3i of the lateral groove 3, the radius R of curvature of the arcuate portion 10 is preferably 1.5 mm or more, more preferably 2.0 mm or more, but preferably 3.0 mm or less, more preferably 2.5 mm or less. At the axially outer end 3e of the lateral groove 3, on the other hand, the radius R of curvature of the arcuate portion 10 is preferably 3.5 mm or more, more preferably 4.0 mm or more, but preferably 5.0 mm or less, more preferably 4.5 mm or less.

Preferably, the inclined surface 8 has an angle θ1 in a range from 5 to 30 degrees with respect to the tread surface 2a. If the angle θ1 of the inclined surface 8 is smaller than 5 degrees, the load during braking is concentrated on the minimum portion 5, and the uneven wear resistance of the tire 1 may not be improved.

If the angle θ1 of the inclined surface 8 is larger than 30 degrees, the load during braking is concentrated on the opening 4, and the uneven wear resistance of the tire 1 may not be improved.

The angle θ1 is defined by that of a line segment connecting the minimum portion 5 and the edge of the opening 4.

In the present embodiment, the length (a) in the tire radial direction of the inclined surface 8 is constant along the longitudinal direction of the lateral groove 3.

In such inclined surface 8, the angle θ1 becomes smaller on the axially outside than on the axially inside of the lateral groove 3. In other words, the inclined surface 8 in the present embodiment is formed as a twisted surface.

As a result, during braking, the ground contact area is smoothly increased on the axially outside, and the uneven wear resistance and the braking performance are further improved.

In the present embodiment, the length (a) of the inclined surface 8 is the same as the minimum distance L3 in the tire radial direction between the opening 4 and the minimum portion 5.

The inclined surface 8 is formed on one of the groove walls 11, in the present embodiment, formed on each of the groove walls 11.

As a result, the ground pressure can be effectively equalized not only during braking but also during driving.

It is preferable that the length b1 in the groove width direction of the inclined surface 8 measured at the axially inner end 8i of the inclined surface 8, is 30% to 70% of the length b2 in the groove width direction of the inclined surface 8 measured at the axially outer end 8e of the inclined surface 8.

Since the length b1 at the axially inner end 8i of the inclined surface 8 is 30% or more of the length b2 at the axially outer end 8e of the inclined surface 8, the amount of wear which occurs at the axially inner end 8i where the contact pressure is relatively small, can be reduced.

Since the length b1 at the axially inner end 8i of the inclined surface 8 is 70% or less of the length b2 at the axially outer end 8e of the inclined surface 8, the contact pressure is equalized between the axially inner side and the axially outer side of the lateral groove 3.

From such a viewpoint, the length b1 at the axially inner end 8i of the inclined surface 8 is more preferably 40% or more, but more preferably 60% or less of the length b2 at the axially outer end 8e of the inclined surface 8.

In the present embodiment, the lateral groove 3, from the minimum portion 5 to the maximum portion 6, is formed by an internal inclined surface 12 which is inclined with respect to the radial direction of the tire.

The internal inclined surface 12 in the present embodiment is composed of a flat surface 12a and a curved surface 12b. Such lateral groove 3 can increase the groove width W2 of the maximum portion 6 while maintaining the rigidity of the tire 1, and can improve the uneven wear resistance and the braking performance of the tire 1.

Preferably, the flat surface 12a of the internal inclined surface 12 has an inclination angle θ2 in a range from 5 to 25 degrees with respect to the tire radial direction. If the angle θ2 of the internal inclined surface 12 is smaller than 5 degrees, the groove width W2 of the maximum portion 6 becomes small, and the uneven wear resistance of the tire 1 may not be improved.

If the angle θ2 of the internal inclined surface 12 is larger than 25 degrees, the rigidity of the tire 1 is lowered, and the braking performance thereof may not be improved.

In the present embodiment, the lateral groove 3, from the maximum portion 6 to the groove bottom portion 7, is formed by a curved surface 7a which is curved in the groove width direction.

The groove bottom portion 7 is, for example, formed at the center of the curved surface 7a which is curved in the groove width direction.

Thereby, the lateral groove 3 in the present embodiment has the largest groove depth at the center in the groove width direction. Such lateral groove 3 can maintain the rigidity of the tire 1 and enhance the uneven wear resistance of the tire.

In the lateral groove 3, it is preferable that the groove width W1 of the minimum portion 5 and the groove width W2 of the maximum portion 6 are constant along the longitudinal direction of the lateral groove 3.

Since the lateral groove 3 can maintain the rigidity of the tire 1 evenly in the longitudinal direction of the lateral groove 3, the braking performance of the tire 1 can be further improved.

The lateral groove 3 extends across, for example, a land region 9 of the tread portion.

Figure 4:
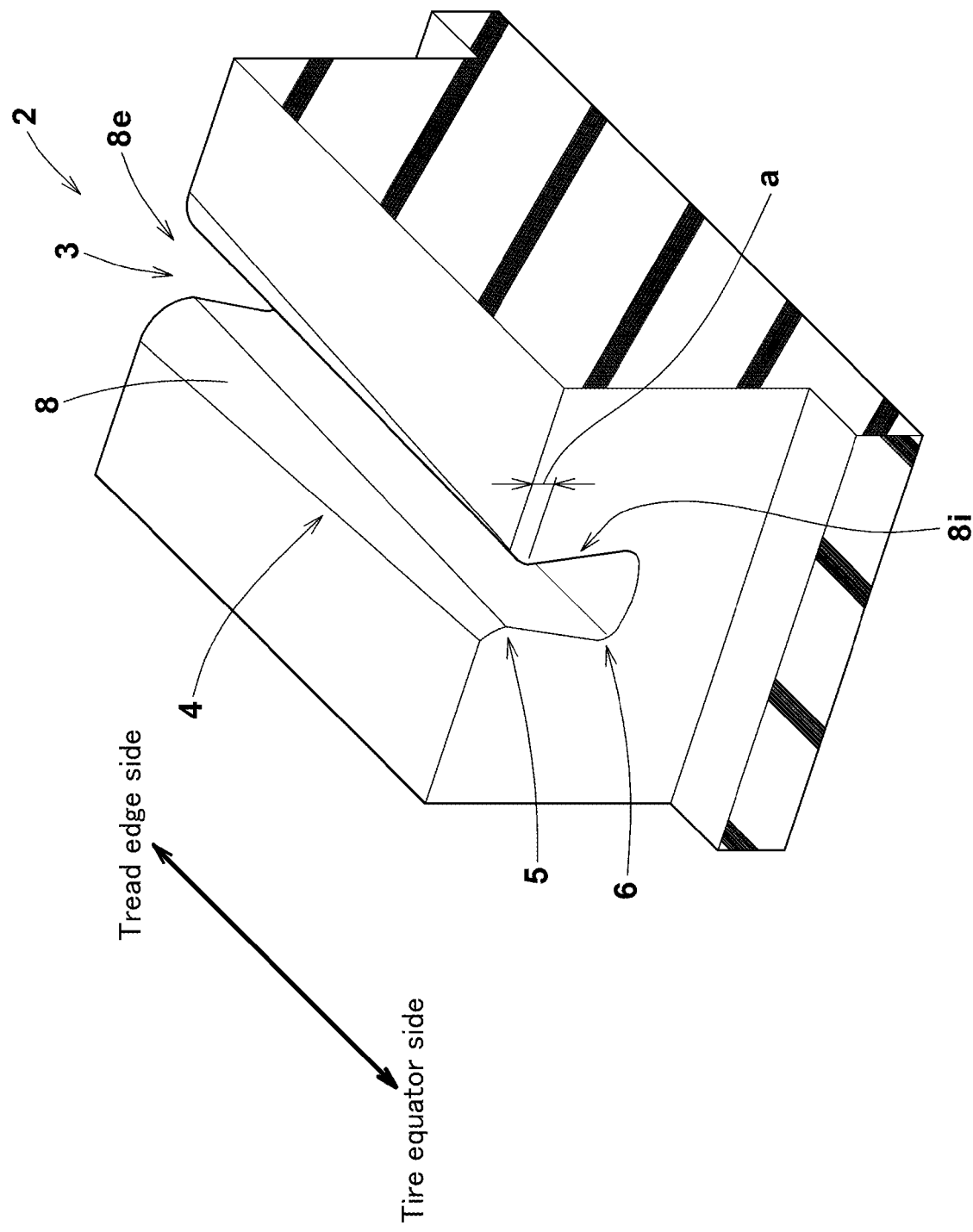
FIG. 4 is a perspective view of another example of the lateral groove.
Figure 5A:
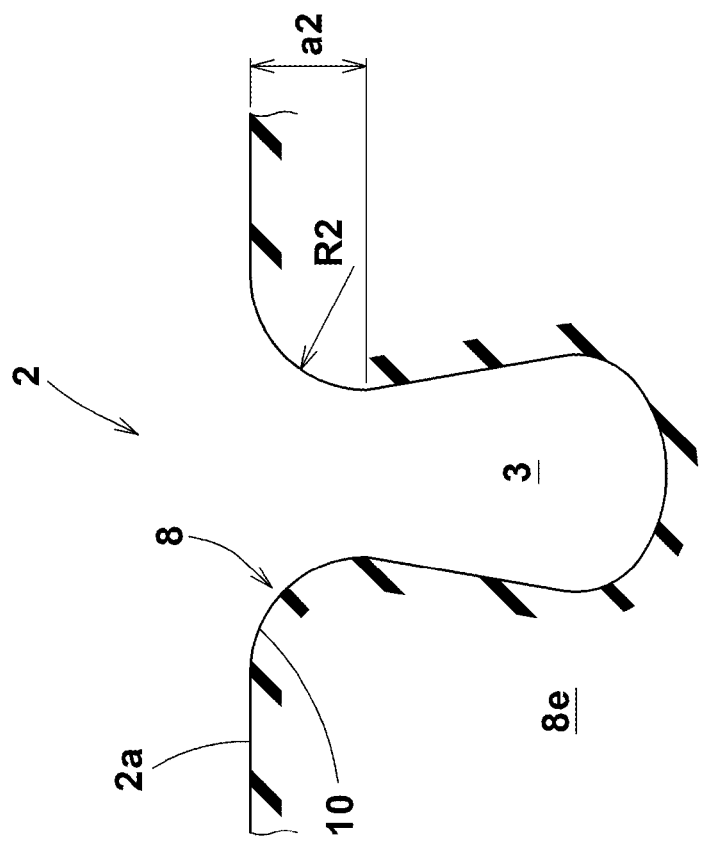
FIG. 5A is a cross-sectional view of the lateral groove of FIG. 4 at a position on the tire equator side.
Figure 5B:
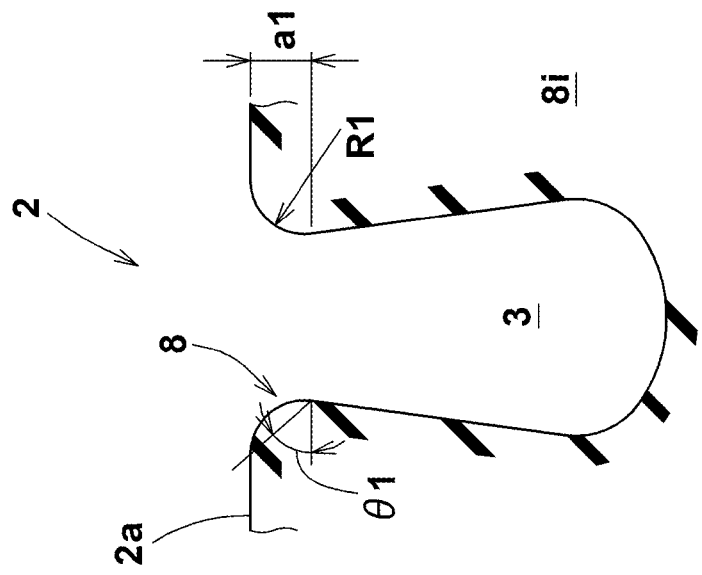
FIG. 5B is a cross-sectional view of the lateral groove of FIG. 4 at a position on the tread edge side.

FIG. 4 is a perspective view of a part of the tread portion 2 of another embodiment. FIG. 5A is a cross-sectional view of the lateral groove 3 of FIG. 4 taken at a position on the tire equator C side. FIG. 5B is a cross-sectional view of the lateral groove 3 of FIG. 4 taken at a position on the tread edge Te side. The same components as those of the tread portion 2 in the former embodiment may be designated by the same reference numerals, and redundant descriptions may be omitted. The "tread edge Te" is the axially outermost edge of the ground contact patch of the tire when the tire 1 under the normal state is placed on a flat surface at a camber angle of 0 degree and loaded with the normal load.

As shown in FIGS. 4 and 5, in this embodiment, the length (a) in the tire radial direction of the inclined surface 8 of the lateral groove 3 is increased toward the outside in the tire axial direction.

Such inclined surface 8 increases the frictional force coefficient during braking on the outside in the tire axial direction, and the braking performance is improved. Further, the load during braking is effectively reduced, and the uneven wear resistance is improved.

In order to effectively derive the above-mentioned function, the ratio (a1/a2) of the inclined surface 8 is preferably 0.5 or more, more preferably 0.6 or more, but preferably 0.8 or less, more preferably 0.7 or less, wherein a1 is the length in the tire radial direction of the inclined surface 8 measured at the axially inner end 8i, and a2 is the length in the tire radial direction of the inclined surface 8 measured at the axially outer end 8e.

Preferably, the inclined surface 8 has the same angle θ1 with respect to the tread surface 2a on the axially inside and the axially outside of the lateral groove 3.

In such lateral groove 3, damage to the inclined surface 8 can be effectively suppressed.

The inclined surface 8 in this embodiment is formed by an untwisted surface, unlike the inclined surface 8 in the former embodiment.

The inclined surface 8 has, for example, an arcuate portion 10 which is convex toward the inside of the lateral groove 3.

The inclined surface 8 in this embodiment is formed as a curved surface in which the arcuate portion 10 extends inward and outward in the tire axial direction of the lateral groove 3.

The inclined surface 8 is not limited to such configuration, and may be formed as, for example, a flat surface which is linear in the cross section of the lateral groove 3 (not shown).

Figure 6:
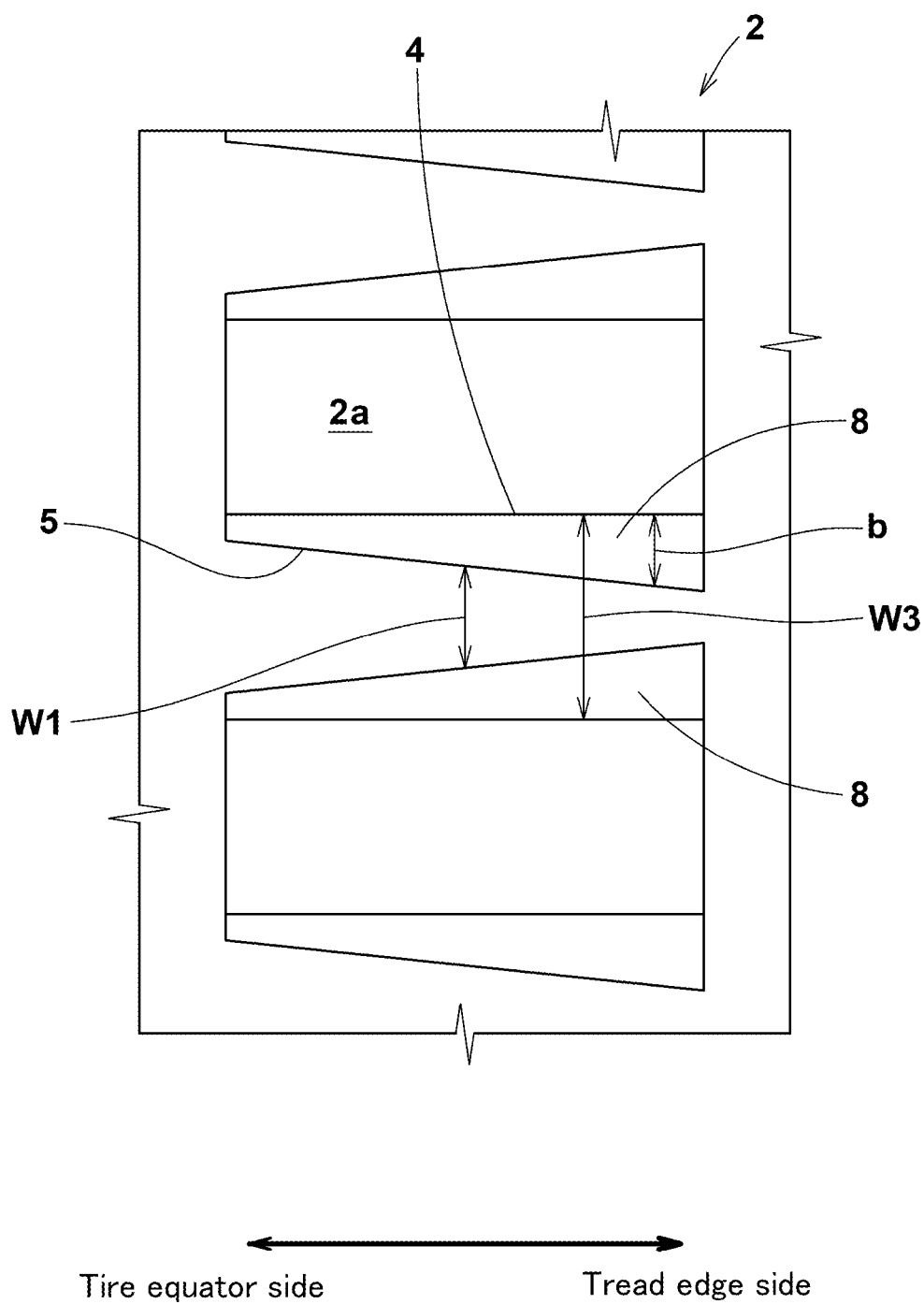
FIG. 6 is a plan view of a part of the tread portion showing still another example of the lateral groove.

FIG. 6 is a plan view of a part of the tread portion 2 of still another embodiment. The same components as those of the tread portion 2 in the former embodiment may be designated by the same reference numerals, and redundant descriptions may be omitted.

As shown in FIG. 6, in this embodiment, the length b in the groove width direction of the inclined surface 8 increases toward the outside in the tire axial direction.

Further, in this embodiment, the width w3 of the opening 4 is constant along the longitudinal direction of the lateral groove 3. Even in such embodiment, the lateral groove 3 can improve the braking performance and uneven wear resistance.

In this embodiment, the groove width W1 of the minimum portion 5 becomes smaller toward the outside in the tire axial direction.

Figure 7:
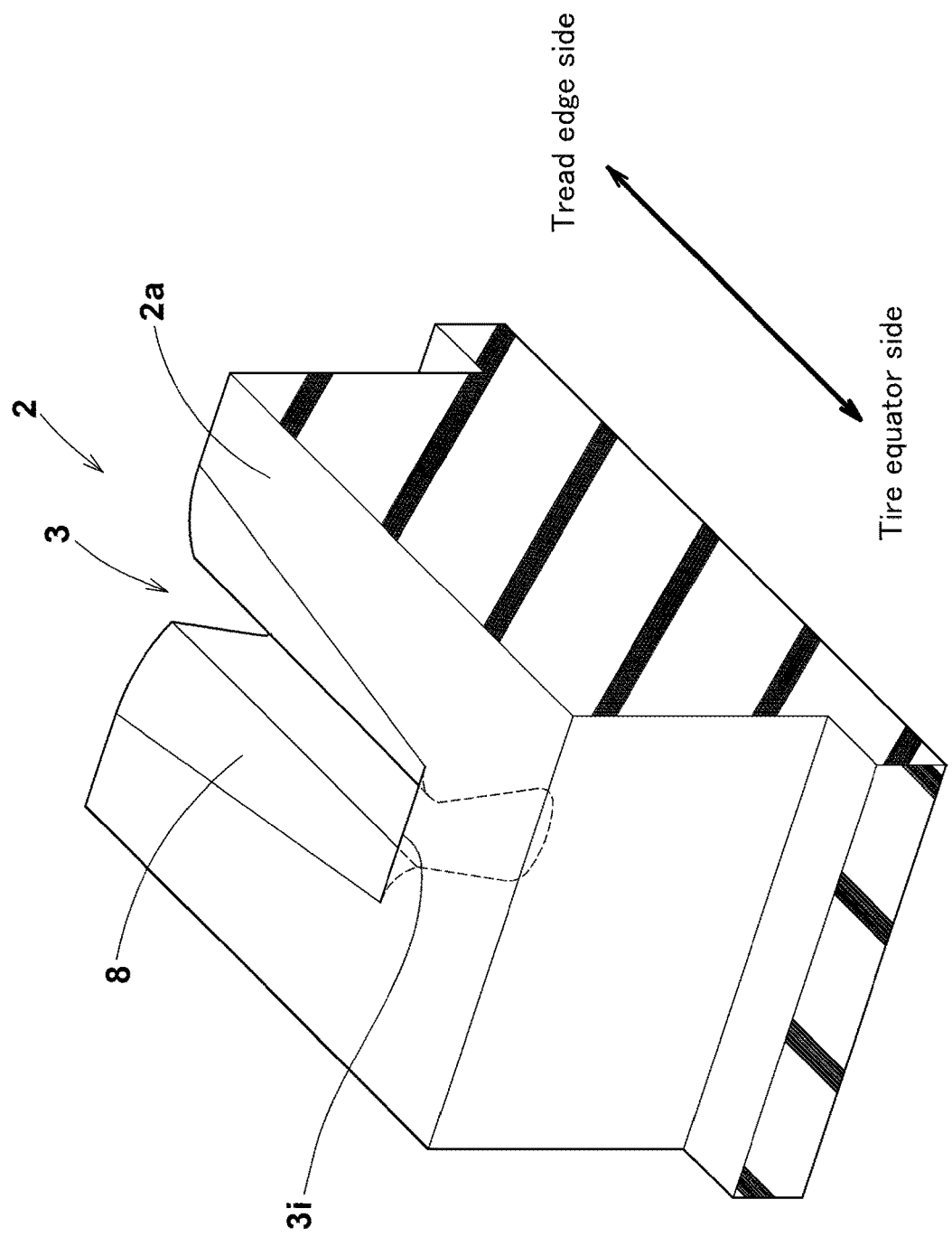
FIG. 7 is a perspective view of yet still another example of the lateral groove.

FIG. 7 is a perspective view of a part of the tread portion 2 of still another embodiment. The same components as those of the tread portion 2 in the former embodiment may be designated by the same reference numerals, and redundant descriptions may be omitted.

As shown in FIG. 7, in this embodiment, one of ends (in this example, the axially inner end 3i) of the lateral groove 3 is terminated in the tread surface 2a.

Even in such embodiment, the ground contact pressure can be equalized between the axially inner side and the axially outer side of the lateral groove 3, and thereby, the braking performance and uneven wear resistance can be improved. Instead of the axially inner end 3i, the axially outer end of the lateral groove 3 may be terminated within the tread surface 2a.

Further, both of the axially inner and outer ends of the lateral groove 3 may be terminated within the tread surface 2a.

Figure 8:
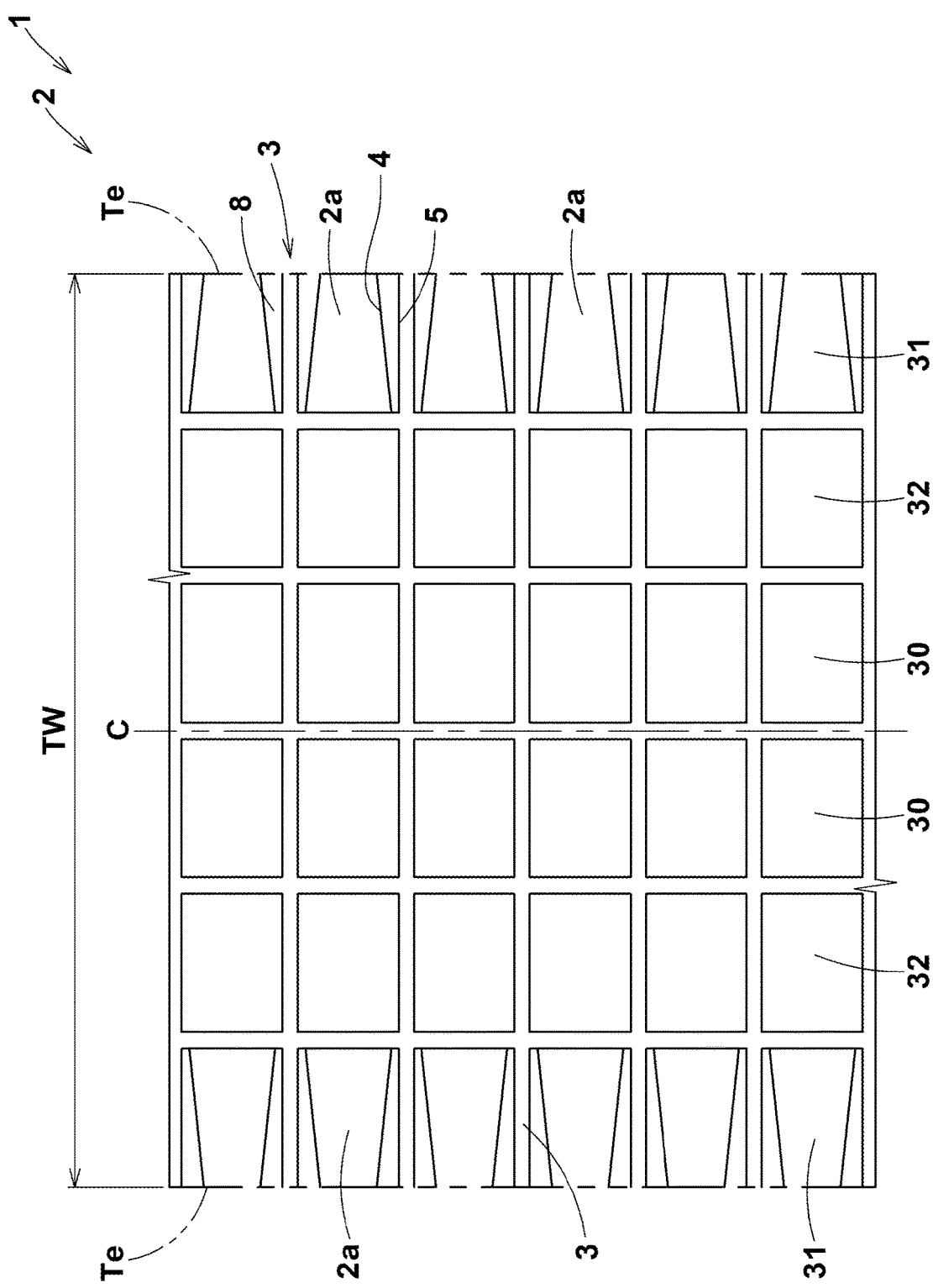
FIG. 8 is a developed plan view of a part of a tread portion showing an example of the arrangement of the lateral grooves.

FIG. 8 is a developed plan view of a part of the tread portion 2 between the tread edges Te.

As shown in FIG. 8, in the tread portion 2 in this embodiment, there are formed a pair of crown land regions 30, a pair of shoulder land regions 31, and a pair of middle land regions 32.

The pair of crown land regions 30 are disposed one on each side of the tire equator C so as to be adjacent to the tire equator C.

The pair of shoulder land regions 31 extend axially inwardly from the respective tread edges Te.

The pair of middle land regions 32 are disposed between the crown land regions 30 and the shoulder land regions 31.

In the tread portion 2 shown in FIG. 8, only the shoulder land region 31 is provided with the lateral grooves 3 shown in FIG. 1, namely, the lateral groove of which the opening width w3 increases toward the outside in the tire axial direction. In this embodiment, the lateral grooves 3 are extended to the tread edge Te.

The shoulder land region 31 is such a land region that, during cornering, an axially outer part is subjected to a larger lateral force than an axially inner part, and thereby, a high ground pressure is generated.

Therefore, by providing the lateral grooves 3 of FIG. 1 in the shoulder land region 31, excellent braking performance, uneven wear resistance, and noise performance are exhibited.

In particular, as compared with the inboard shoulder land region 31 to be positioned close to the center of a vehicle body, the outboard shoulder land region 31 to be positioned away from to the center of the vehicle body has a larger difference in ground contact pressure between the axially inner part and axially outer part.

Therefore, it is preferable that at least the outboard shoulder land region 31 is provided with the lateral grooves 3.

In this embodiment, the inboard shoulder land region 31 is also provided with the lateral grooves 3.

Figure 9:
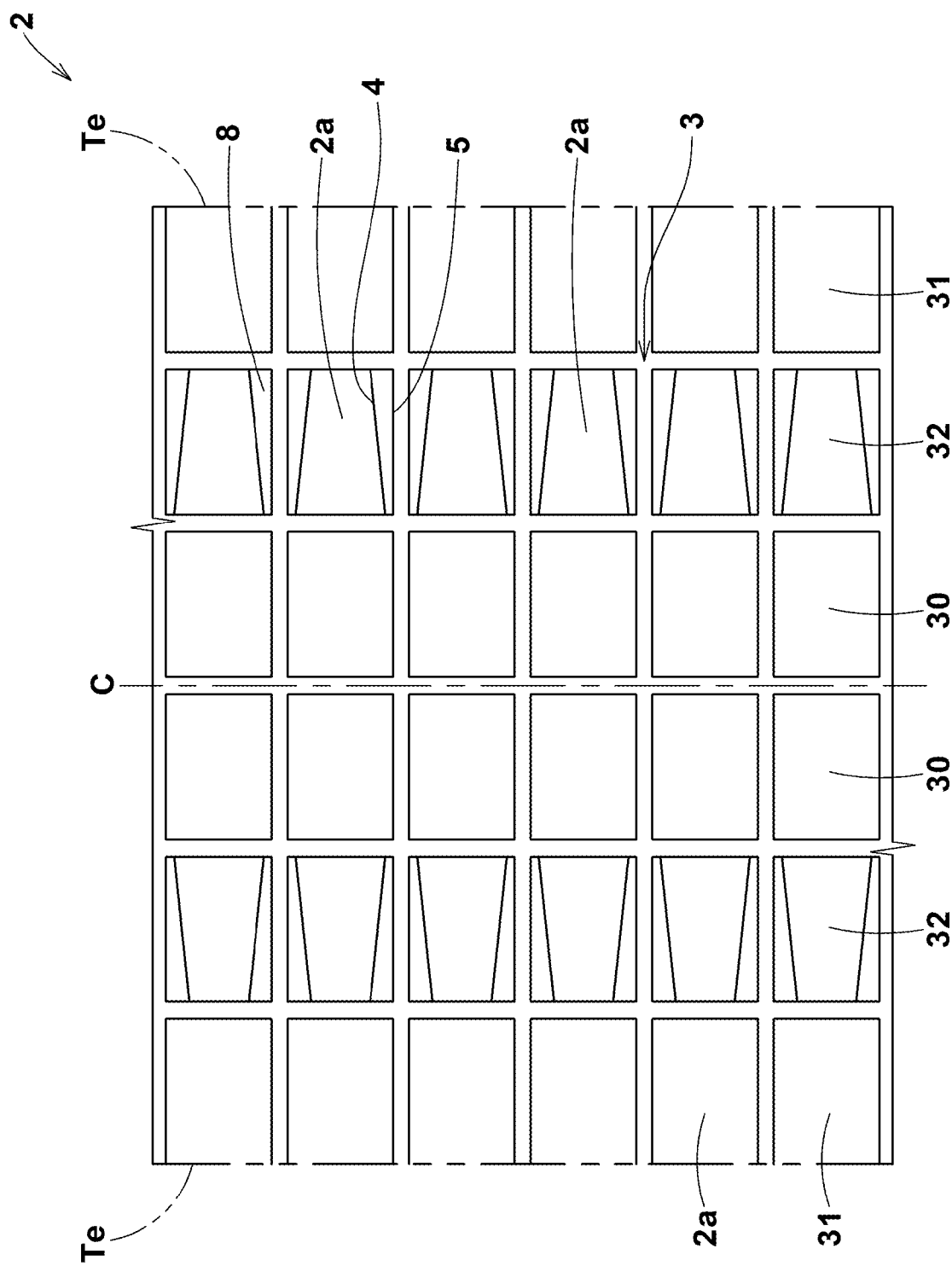
FIG. 9 is a developed plan view of a part of a tread portion showing another example of the arrangement of the lateral grooves.

FIG. 9 is a developed plan view of a part of the tread portion 2 of another embodiment, in which only the middle land region 32 is provided with the lateral grooves 3 of which the opening width w3 increases toward the outside in the tire axial direction.

The middle land region 32 is a land region on which a lateral force larger than that of the crown land region 30 acts during cornering.

Therefore, by providing the lateral grooves 3 in the middle land region 32, excellent braking performance, uneven wear resistance, and noise performance can be exhibited.

In particular, it is preferable to provide the lateral grooves 3 at least in the outboard middle land region 32 intended to be positioned away from the center of a vehicle body.

In this embodiment, the inboard middle land region 32 to be positioned close to the center of the vehicle body is also provided with the lateral grooves 3.

Figure 10:
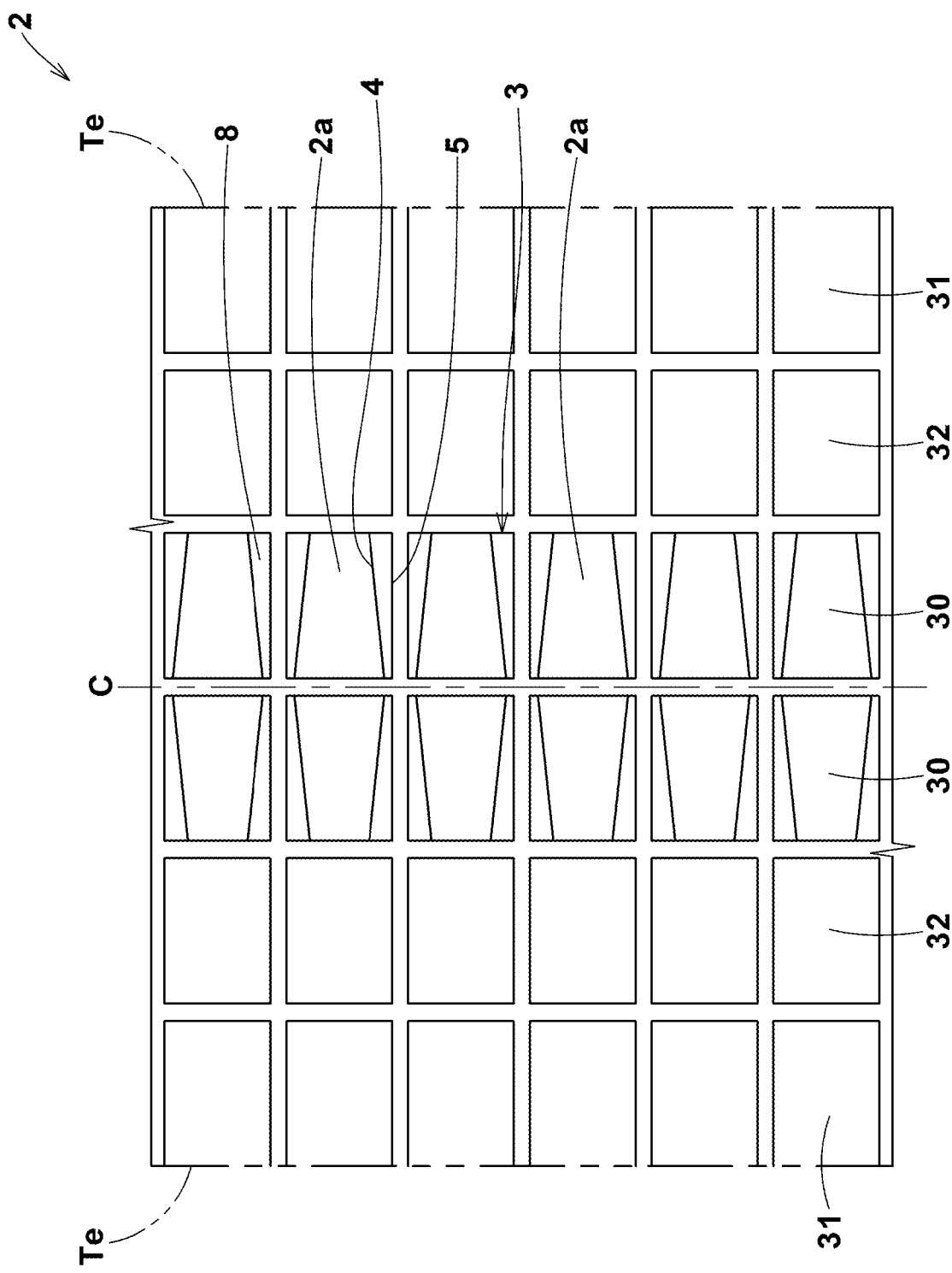
FIG. 10 is a developed plan view of a part of a tread portion showing still another example of the arrangement of the lateral grooves.

FIG. 10 is a developed plan view of a part of the tread portion 2 of still another embodiment.

In this embodiment, only the crown land region 30 is provided with the lateral grooves 3 of which the opening width w3 increases toward the outside in the tire axial direction.

In the crown land region 30, a larger contact pressure acts on an axially outer part than on the axially inner part.

Therefore, by providing the lateral grooves 3 in the crown land regions 30, excellent braking performance, uneven wear resistance, and noise performance can be exhibited.

In particular, it is preferable to provide the lateral grooves 3 at least in the outboard crown land region 30.

In this embodiment, the inboard crown land region 30 is also provided with the lateral grooves 3.

While detailed description has been made of especially preferable embodiments of the present disclosure, the present disclosure can be embodied in various forms without being limited to the illustrated embodiments and examples.

Comparison Tests

Based on the lateral groove shown in FIG. 1 and the tread pattern shown in FIG. 8, pneumatic tires of size 205/55R16 having the specifications shown Table 1 were experimentally manufactured. Each test tire was tested for the braking performance, uneven wear resistance and noise performance.

Specifications common to all of the test tires and test methods are as follows.
Wheel rim size: 16×6.5
Tire internal pressure: 200 kPa
Test vehicle: 2000 cc, Four-wheel drive vehicle
Mounting positions of test tires: all wheels
W1: 2 mm
W2: 3.5 mm
b1: 2.3 mm
W3a: 6.6 mm <Braking Performance Test>
Using the above test vehicle running on a dry asphalt road, the braking performance including the steering wheel operability and stability during braking was evaluated by the test driver.

The results are indicated by a grade based on the comparative example being 100. The larger the value, the more stable and better the braking.

<Uneven Wear Resistance Performance Test>
After running for 10,000 km on a dry asphalt road with the above test vehicle, the state of wear at the axially inner and outer ends of a plurality of the lateral grooves was evaluated sensuously by the test driver.

The results are indicated by a grade based on the state of wear of the comparative example being 100. The larger the value, the smaller and better the uneven wear.

<Noise Performance Test>
When the above test vehicle was running on a dry asphalt road at a speed of 60 km/h, the noise heard in the interior of the vehicle was evaluated sensuously by the test driver.

The results are indicated by a grade based on the comparative example being 100. The larger the value, the smaller and better the noise.

The test results are shown in Table 1.

| Tire | comparative example | working example 1 | working example 2 | working example 3 | working example 4 |
|---|---|---|---|---|---|
| W3a/W3b (%) | 100 | 66 | 75 | 50 | 90 |
| b1/b2 (%) | 100 | 58 | 58 | 58 | 58 |
| braking performance | 100 | 110 | 106 | 107 | 106 |
| uneven wear resistance | 100 | 110 | 106 | 107 | 106 |
| noise performance | 100 | 110 | 106 | 107 | 105 |

| Tire | working example 5 | working example 6 | working example 7 | working example 8 | working example 9 |
|---|---|---|---|---|---|
| W3a/W3b (%) | 40 | 66 | 66 | 66 | 66 |
| b1/b2 (%) | 58 | 30 | 35 | 50 | 75 |
| braking performance | 104 | 106 | 106 | 108 | 105 |
| uneven wear resistance | 104 | 106 | 106 | 108 | 105 |
| noise performance | 104 | 106 | 106 | 108 | 105 |

From the test results, it was confirmed that the working example tires had excellent braking performance while maintaining the uneven wear resistance, and also had excellent noise performance.

Statement of the Disclosure

The present disclosure is as follows:

Disclosure 1. A tire comprising a tread portion which has a tread surface and is provided with a lateral groove extending in a tire axial direction, wherein in the tread surface, the lateral groove has an opening of which width increases toward an outside in the tire axial direction, and in a cross section of the lateral groove perpendicular to the longitudinal direction of the lateral groove, the lateral groove has a minimum portion at which the groove width is smallest and which is located radially inside the opening, and a maximum portion at which the groove width is largest and which is located radially inside the minimum portion.

Disclosure 2. The tire according to Disclosure 1, wherein the lateral groove has, between the opening and the minimum portion, an inclined surface inclined with respect to the radial direction of the tire, and the inclined surface is a twisted surface.

Disclosure 3. The tire according to Disclosure 2, wherein
in the cross section of the lateral groove, the inclined surface has an arcuate portion which is convex toward the inside of the lateral groove and has a radius of curvature, and
the radius of curvature of the arcuate portion is increased toward the outside in the tire axial direction.

Disclosure 4. The tire according to Disclosure 2 or 3, wherein
a length in the groove width direction of the inclined surface measured at the axially inner end of the inclined surface is 30% to 70% of
a length in the groove width direction of the inclined surface measured at the axially outer end of the inclined surface.

Disclosure 5. The tire according to any one of Disclosures 2 to 4, wherein
a length in the tire radial direction of the inclined surface is constant along the longitudinal direction of the lateral groove.

Disclosure 6. The tire according to any one of Disclosures 2 to 4, wherein
a length in the tire radial direction of the inclined surface is increased toward the outside in the tire axial direction.

Disclosure 7. The tire according to Disclosure 6, wherein
the length (a1) in the tire radial direction of the inclined surface measured at the axially inner end of the inclined surface is in a range from 0.5 to 0.8 times the length (a2) in the tire radial direction of the inclined surface measured at the axially outer end of the inclined surface.

Disclosure 8. The tire according to any one of Disclosures 1 to 7, wherein
the lateral groove is extended to a tread edge.

Disclosure 9. The tire according to any one of Disclosures 1 to 7, wherein
the tread portion comprises a shoulder land region extending axially inwardly from a tread edge, and a middle land region disposed on the tire equator side of the shoulder land region, and
the lateral groove is disposed in the middle land region.

Disclosure 10. The tire according to any one of Disclosures 1 to 9, wherein
a mounting direction when the tire is mounted on a vehicle is specified for the tread portion.

Disclosure 11. A tire comprising a tread portion which has a tread surface and is provided with a lateral groove extending in a tire axial direction, wherein
in a cross section of the lateral groove perpendicular to the longitudinal direction of the lateral groove, the lateral groove has a minimum portion at which the groove width is smallest and which is located radially inside the tread surface, and a maximum portion at which the groove width is largest and which is located radially inside the minimum portion,
at least one of groove walls of the lateral groove comprises, between the tread surface and the minimum portion, an inclined surface which is inclined radially inwardly toward the inside of the lateral groove, and
in a plan view of the tread portion, a length in the groove width direction of the inclined surface is increased toward an outside in the tire axial direction.

DESCRIPTION OF THE REFERENCE SIGNS 1 tire
2 tread portion
2a tread surface
3 lateral groove
4 opening
5 minimum portion
6 maximum portion

The invention claimed is:
1. A tire comprising a tread portion which has a tread surface and is provided with a lateral groove extending in a tire axial direction, wherein
in the tread surface, the lateral groove has an opening at an outermost portion of the lateral groove in a tire radial direction, of which width increases toward an outside in the tire axial direction, and
in a cross section of the lateral groove perpendicular to the longitudinal direction of the lateral groove, the lateral groove has a minimum portion at which the groove width is smallest and which is located radially inside the opening, and a maximum portion at which the groove width is locally largest and which is located radially inside the minimum portion, wherein
the lateral groove has, between the opening and the minimum portion, an inclined surface inclined with respect to the radial direction of the tire, and the inclined surface is a twisted surface,
a length in the groove width direction of the inclined surface measured at an axially inner end of the inclined surface is 30% to 70% of a length in the groove width direction of the inclined surface measured at an axially outer end of the inclined surface, and
a width of the opening at an axially inner end of the lateral groove in the tire axial direction is 40% or more and 70% or less of a width of the opening at an axially outer end of the lateral groove in the tire axial direction.

2. The tire according to claim 1, wherein
a length in the tire radial direction of the inclined surface measured at the axially inner end of the inclined surface is in a range from 0.5 to 0.8 times a length in the tire radial direction of the inclined surface measured at the axially outer end of the inclined surface.

3. The tire according to claim 1, wherein
the lateral groove is extended to a tread edge.

4. A tire comprising a tread portion which has a tread surface and is provided with a lateral groove extending in a tire axial direction, wherein
in a cross section of the lateral groove perpendicular to the longitudinal direction of the lateral groove, the lateral groove has a minimum portion at which the groove width is smallest and which is located radially inside the tread surface, and a maximum portion at which the groove width is locally largest and which is located radially inside the minimum portion,
at least one of groove walls of the lateral groove comprises, between the tread surface and the minimum portion, an inclined surface which is inclined radially inwardly toward the inside of the lateral groove,
in a plan view of the tread portion, a length in the groove width direction of the inclined surface is increased toward an outside in the tire axial direction,
in the tread surface, the lateral groove has an opening at an outermost portion of the lateral groove in a tire radial direction, of which width increases toward an outside in the tire axial direction,
the lateral groove has, between the opening and the minimum portion, an inclined surface inclined with respect to the radial direction of the tire, and the inclined surface is a twisted surface,
a length in the groove width direction of the inclined surface measured at an axially inner end of the inclined surface is 30% to 70% of a length in the groove width direction of the inclined surface measured at an axially outer end of the inclined surface, and a width of the opening at an axially inner end of the lateral groove in the tire axial direction is 40% or more and 70% or less of a width of the opening at an axially outer end of the lateral groove in the tire axial direction.

5. A tire comprising:

a tread portion having a tread surface and provided with a lateral groove extending in a tire axial direction, the lateral groove having a radially innermost groove bottom, a pair of opposite groove walls, and an opening opened at the tread surface, between radially outer ends of the opposite groove walls, wherein in a cross section of the lateral groove perpendicular to a longitudinal direction of the lateral groove, each of the groove walls comprises:

an inclined surface extending from the tread surface to a first point on the groove wall, while inclining to an inside in a tire radial direction, and an internal inclined surface extending radially inwardly from the first point to a second point on the groove wall, the internal inclined surface is composed of a flat surface and a curved surface, the flat surface extends radially inwardly from the first point to the curved surface, while inclining with respect to the tire radial direction to an outside of the lateral groove in a widthwise direction of the lateral groove, the curved surface extends radially inwardly from the flat surface to the second point, while curving convexly toward the outside of the lateral groove in the widthwise direction of the lateral groove, and in the cross section of the lateral groove, a groove width between the first points on the opposite groove walls is locally minimum, and a groove width between the second points on the opposite groove walls is locally maximum, wherein a width of the opening of the lateral groove at the tread surface gradually increases toward an outside in the tire axial direction, and the groove width between the first points is constant in the tire axial direction.

6. The tire according to claim 5, wherein in the cross section of the lateral groove, a minimum distance in the tire radial direction between the first point and the second point is larger than a minimum distance in the tire radial direction between the second point and the groove bottom, the minimum distance in the tire radial direction between the first point and the second point is larger than a minimum distance in the tire radial direction from the opening to the first point, and the minimum distance in the tire radial direction from the opening to the first point is larger than the minimum distance in the tire radial direction between the second point and the groove bottom.

7. The tire according to claim 6, wherein the inclined surface is a curved surface which is convex in the cross section of the lateral groove or alternatively a flat surface which is linear in the cross section of the lateral groove, an angle of the inclined surface, which is defined by an angle of a straight line drawn between the first point and an edge of the opening at the tread surface in the cross section of the lateral groove, is in a range from 5 to 30 degrees with respect to the tread surface, and a dimension of the inclined surface measured in the lateral groove widthwise direction is gradually increased toward an outside in the tire axial direction.

8. The tire according to claim 7, wherein the inclined surface is the curved surface which is arcuate and has a radius of curvature in the cross section of the lateral groove, and the radius of curvature is continuously increased from an axially inner end to an axially outer end of the lateral groove.

9. The tire according to claim 7, wherein the angle of the inclined surface is gradually decreased toward an outside in the tire axial direction.

10. The tire according to claim 9, wherein a dimension in the tire radial direction of the inclined surface is constant in the tire axial direction.

11. The tire according to claim 7, wherein the angle of the inclined surface is constant in the tire axial direction.

12. The tire according to claim 11, wherein a dimension in the tire radial direction of the inclined surface is gradually increased from an axially inner end to an axially outer end of the lateral groove.

13. The tire according to claim 12, wherein a dimension in the tire radial direction of the inclined surface measured at the axially inner end is in a range from 0.5 to 0.8 times a dimension in the tire radial direction of the inclined surface measured at the axially outer end.

14. The tire according to claim 5, wherein the lateral groove is extended to a tread edge.

15. The tire according to claim 5, wherein the tread portion comprises a shoulder land region extending axially inwardly from a tread edge, and a middle land region disposed axially inside the shoulder land region, and the lateral groove is disposed in the middle land region.

16. A tire comprising:

a tread portion having a tread surface and provided with a lateral groove extending in a tire axial direction, the lateral groove having a radially innermost groove bottom, a pair of opposite groove walls, and an opening opened at the tread surface, between radially outer ends of the opposite groove walls, wherein in a cross section of the lateral groove perpendicular to a longitudinal direction of the lateral groove, each of the groove walls comprises:

an inclined surface extending from the tread surface to a first point on the groove wall, while inclining to an inside in a tire radial direction, and an internal inclined surface extending radially inwardly from the first point to a second point on the groove wall, the internal inclined surface is composed of a flat surface and a curved surface, the flat surface extends radially inwardly from the first point to the curved surface, while inclining with respect to the tire radial direction to an outside of the lateral groove in a widthwise direction of the lateral groove, the curved surface extends radially inwardly from the flat surface to the second point, while curving convexly toward the outside of the lateral groove in the widthwise direction of the lateral groove, and in the cross section of the lateral groove, a groove width between the first points on the opposite groove walls is locally minimum, and a groove width between the second points on the opposite groove walls is locally maximum, wherein a width of the opening of the lateral groove at the tread surface is constant in the tire axial direction, and the groove width between the first points gradually decreases toward an outside in the tire axial direction.

17. The tire according to claim 16, wherein in the cross section of the lateral groove, a minimum distance in the tire radial direction between the first point and the second point is larger than a minimum distance in the tire radial direction between the second point and the groove bottom, the minimum distance in the tire radial direction between the first point and the second point is larger than a minimum distance in the tire radial direction from the opening to the first point, and the minimum distance in the tire radial direction from the opening to the first point is larger than the minimum distance in the tire radial direction between the second point and the groove bottom.

18. The tire according to claim 17, wherein the inclined surface is a curved surface which is convex in the cross section of the lateral groove or alternatively a flat surface which is linear in the cross section of the lateral groove, an angle of the inclined surface, which is defined by an angle of a straight line drawn between the first point and an edge of the opening at the tread surface in the cross section of the lateral groove, is in a range from 5 to 30 degrees with respect to the tread surface, and a dimension of the inclined surface measured in the lateral groove widthwise direction is gradually increased toward an outside in the tire axial direction.

19. The tire according to claim 18, wherein the inclined surface is the curved surface which is arcuate and has a radius of curvature in the cross section of the lateral groove, and the radius of curvature is continuously increased from an axially inner end to an axially outer end of the lateral groove.

20. The tire according to claim 18, wherein the angle of the inclined surface is gradually decreased toward an outside in the tire axial direction.

* * * * *